United States Patent [19]

Knappe

[11] 4,373,545
[45] Feb. 15, 1983

[54] DOUBLE BLOCK AND VENT VALVE

[75] Inventor: Herman E. Knappe, Cedar Rapids, Iowa

[73] Assignee: Cherry-Burrell Corporation, Cedar Rapids, Iowa

[21] Appl. No.: 228,229

[22] Filed: Jan. 26, 1981

[51] Int. Cl.³ ............... F16K 11/20; F16K 51/00
[52] U.S. Cl. .................................. 137/240; 137/312; 137/614.17; 137/614.18; 137/614.19; 251/86
[58] Field of Search ........... 137/238, 240, 312, 614.17, 137/614.18, 614.19, 614.11; 251/210, 84, 86

[56] References Cited

U.S. PATENT DOCUMENTS

| 3,974,855 | 8/1976 | Webb | 251/84 |
|---|---|---|---|
| 4,239,061 | 12/1980 | Peterson | 251/210 |

FOREIGN PATENT DOCUMENTS

| 2532838 | 7/1975 | Fed. Rep. of Germany | |
| 2609791 | 9/1977 | Fed. Rep. of Germany | 137/240 |
| 2623301 | 12/1977 | Fed. Rep. of Germany | 137/240 |
| 2751733 | 5/1979 | Fed. Rep. of Germany | 137/240 |

Primary Examiner—A. Michael Chambers
Attorney, Agent, or Firm—Fitch, Even, Tabin, Flannery & Welsh

[57] ABSTRACT

A valve has an upper region connectable to a first piping system, a lower region connectable to a second piping system and an intermediate passageway therebetween which is opened and closed by a valve member which is reciprocated by an overhead actuator. The valve member has first and second members which are slidable relative to one another. In the closed position, the first and second valve members seal with spaced apart seats and define therebetween an intermediate chamber including the surface of the interior passageway between the seals. A lower valve member extending exterior of the lower region has cleaning solution inlet and outlet passageways which communicate with the intermediate chamber whereby the surfaces of the intermediate chamber may be cleaned and whereby any leakage around either of the seals is drained externally. In the open position in which the valve member is positioned in the upper region, the first and second parts are biased together and a seal is formed between the valve member parts to block communication between the piping systems, the cleaning solution passageways of the valve member and drain.

3 Claims, 4 Drawing Figures

DOUBLE BLOCK AND VENT VALVE

The present invention relates to liquid flow valves and more particularly to valves which may be cleaned in place.

BACKGROUND OF THE INVENTION

In industries which produce liquid products, particularly beverage industries, such as breweries, soft drink bottlers, dairies, etc., large networks of pipes are used to transfer liquid from one place to another. For a variety of reasons, it is necessary to periodically switch the pathways of liquid flow through the pipe network, and accordingly, a large number of switching valves are included in the pipe networks. A modern beverage facility may have a large number of switching valves which are automatically controlled by a central programmable control unit.

A primary requirement in the beverage industry is that cleanliness be maintained throughout the facility. While pipes, through which liquid flows continuously, are generally self-cleaning, it is particularly problematic to maintain cleanliness at the switching valves where liquid may tend to stagnate.

Because it is necessary that the valves, when closed, positively block any liquid flow between pathways, it has become a practice in the industry to use valves with double seats forming leakage chambers therebetween whereby liquid leaking around either seat is drained externally rather than into the other pathway. In order to clean the leakage chambers between the seats of the closed valve, double block and vent or bleed valves have been developed which have passageways through which cleaning solutions may be supplied to the leakage chambers to wash the surfaces thereof. An example of such a valve is described in German Fed. Rep. Published Patent Application No. 2532838.

It is common practice in designing beverage facilities to direct the pipes through a switching area including an array of a large number of switching valves. Double block and vent valves are typically controlled by overhead actuators to which electrical and/or pneumatic control lines are run. When a large number of valves are employed in an array, these lines clutter the area around the valves and may interfere with rapid servicing of the valves. In the valve disclosed in the above-mentioned German Patent Application, overhead cleaning solution lines add to the general clutter above the array of valves. It would be desirable to have double block and vent valves in which the cleaning solution lines are remote from the electrical and pneumatic lines connected to the actuator.

SUMMARY OF THE INVENTION

A valve has a housing including an upper and a lower pipe and an interior passageway therebetween which is alternately opened and closed by a valve member which is reciprocated upwardly and downwardly by an overhead actuator. The valve member has first and second movable parts which are slidable relative to one another and which include upper and lower rings that seal with upper and lower seats in the interior passageway. In the closed position, the first and second movable parts are spaced apart, and the surfaces of the interior passageway between the upper and lower seals may be washed by passing cleaning solution up through a central passageway of a lower valve stem extending through the lower pipe, into the intermediate chamber formed between the upper and lower seals and out through an annular region of the stem around the central passageway. When the valve member is reciprocated upward, opening the passageway between the pipes, a seal is formed between the first and second movable valve parts to prevent liquid from the pipes leaking out through the cleaning solution passageways.

DETAILED DESCRIPTION OF THE PREFERRED EMBODIMENT

Figure 1:
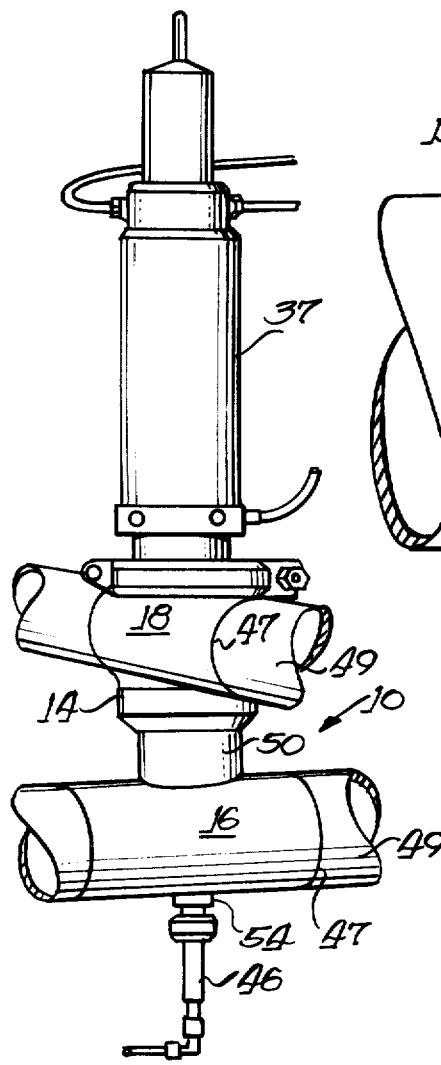
FIG. 1 is a perspective view of a valve embodying various features of the present invention.

In accordance with the present invention, a valve 10 (FIG. 1) has a housing 14 with a lower region or pipe 16 designed for connection with a first piping system and an upper region or pipe 18 designed for connection to a second piping system and an interior passageway 20 (FIG. 2) interconnecting the upper and lower pipes. A valve member 22 reciprocates to open and close the interior passageway 20. The valve member 22 has first and second movable parts 24, 26 including, respectively, lower and upper rings 28, 30 for sealing with lower and upper seats 32, 34 in the interior passageway 20. The first and second valve member parts 24, 26 are slidable relative to one another.

In the closed position with the respective rings 28, 30 sealing with the seats 32, 34, the first and second valve member parts 24 and 26 are spaced apart to provide an intermediate chamber 36. The intermediate chamber 36 is washed by cleaning solution which is introduced upward through an inlet tube 38 which passes through a stem 46 that extends through the lower pipe 16. The cleaning solution from the inlet tube 38 passes through a central passageway 40 in a spindle 42 of the first valve member part 24 and into the intermediate chamber 36 via an upper exit 44 from the central passageway. The cleaning solution exits the intermediate chamber 36 through an annular passageway 48 of the stem 46 around the inlet tube 38. The passageways for cleaning solution permit cleaning of surfaces of the intermediate passageway 36 without interrupting liquid flow through the upper or lower pipes 16, 18 and provide a drain whereby liquid entering the intermediate chamber 36, as a result of failure of either seal, may drain without contaminating the liquid in the other pipe. The introduction and drainage of cleaning solution through the common lower stem 46 remote from the overhead valve actuator 37, which reciprocates the valve member 22, facilitates maintenance of the valve 10, particularly when the valve is included in an array. In the open position, the valve member parts 24, 26 seal together preventing the liquid in the pipes 16 and 18 from draining through the stem 46.

The upper and lower liquid conveying pipes 16, 18 are tubular and have ends 47 connectable to piping 49 of a liquid flow system, and when the valve member 22 is in the closed position, the upper and lower pipes provide generally unhindered flow of liquid therethrough.

The pipes 16, 18, as shown, are conveniently offset from one another by 90°, but the relative orientation of the pipes may be adjusted to fit the requirements of the liquid flow system. The tubular connecting region or throat 50, having an interior wall 51 defining the interior passageway 20 in which the valve member 22 seats, has a thickened body 52 capable of withstanding repeated opening and closing of the valve 10. The upper and lower pipes 16, 18 and the tubular connecting region 50 are preferably welded together to form a unitary housing 14, a feature of significant importance in providing and maintaining proper alignment of the valve member 22 with the housing by eliminating a clamp joint connection which can leak. The valve seats 32, 34 are integral with the housing 14 and are permanently aligned relative to each other.

Although the cross section of the interior passageway 20 is circular throughout, the diameter varies and includes the smaller lower annular seat 32 and the larger upper annular seat 34 allowing reciprocation of the small diameter first valve member part 24 in the area between the seats as the larger diameter second part 26 is in contact with the upper seat and prevented from further downward movement thereby. The upper pipe 18 has an upper opening 56 (FIG. 2) coaxial with the interior passageway 20 through which a rod 58 and sleeve 60 of the valve member extend, and the lower pipe 16 has an opening 54, also coaxial with the interior passageway 20, through which the valve member stem 46 extends, whereby the valve member 22 with the vertically extending stem, rod and sleeve may reciprocate upwardly and downwardly within the housing 14 to open and close the interior passageway 20.

Figure 3:
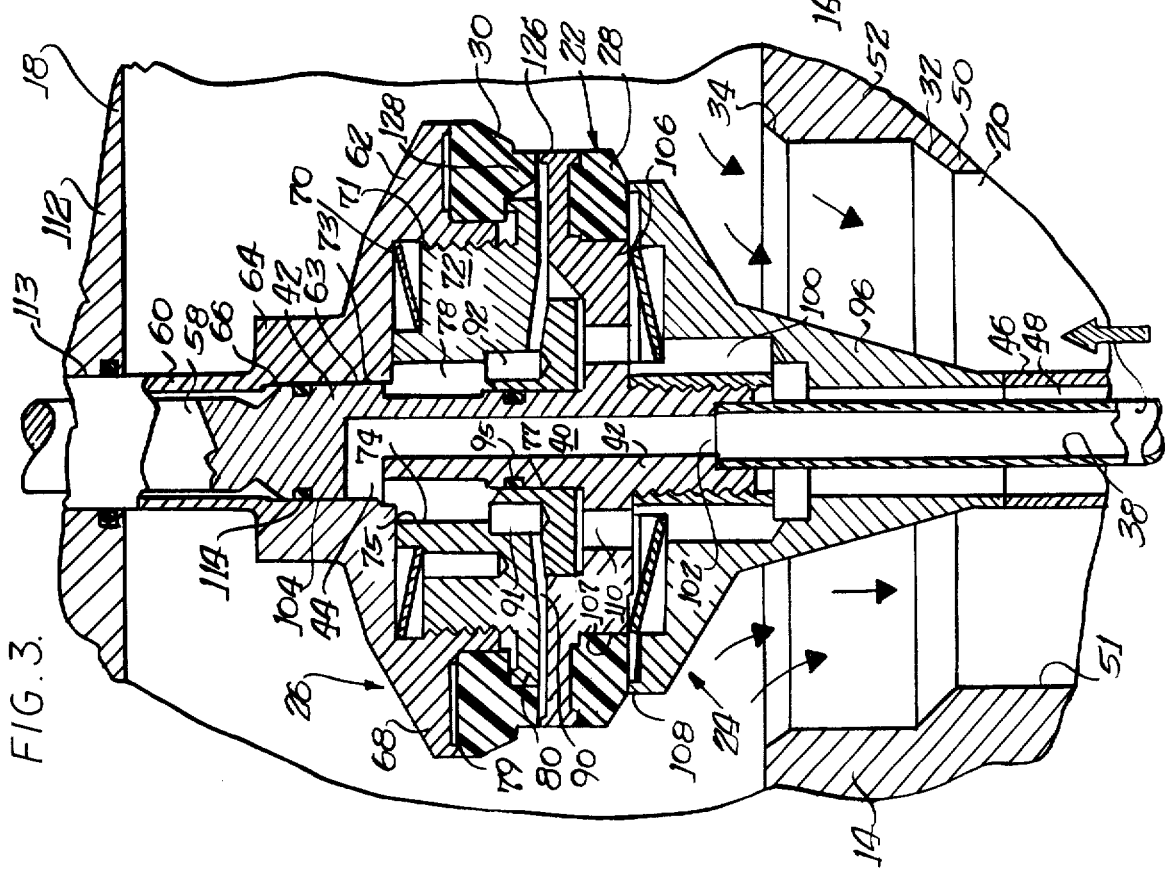
FIG. 3 is a further enlarged cross-sectional view of the valve member of FIG. 2 shown in the open position.

The second valve member part 26 has an outer part 62 and an inner part 72 joined thereto which together provide a cylindrical interior surface 63 that slides relative to the cylindrical sidewall 73 of the spindle 42. The inner part 72 and outer part 62 also define cleaning solution passageways for placing the upper exit 44 of the central passageway 40 in communication with the intermediate chamber 36. The outer part 62 has an upper cylindrical portion 64 having a bore 66 therethrough which mates with reciprocating rod 58 and attached spindle 42, and a lower portion 68 which spreads outward therefrom. The inner part 72 has an outer surface 71 which is threadably engaged within a cylindrical indentation 70 in the lower end of the outer part 62, and an interior bore 74 having a larger diameter upper portion 75 which defines an annular area 78 around that portion of the spindle 42 along which it reciprocates and a lower portion 77 with a diameter matched to the cylindrical sidewall 73 of the spindle along which it reciprocates. The lower bore portion 77 defines with the outer part bore 66, the cylindrical interior surface 63 which slides relative to the spindle sidewall 73. A lower annular flange 80 of the inner part 72 extends outward and holds the upper sealing ring 30 in an annular groove 79 provided in the upper part 62. Passageways 92 (FIG. 3) each having a vertical portion 91 and a constricted generally horizontal portion 90 extending from the lower end thereof, communicate the annular area 78 around the spindle 42 with the intermediate chamber 36. An O-ring 95 disposed around the spindle 42 inside of the lower portion 77 of the interior bore 74 prevents liquid flow therebetween and requires cleaning and rinsing solutions in the annular area 78 to flow through the constricted nozzle passageways 92 sending forceful sprays against the surfaces of the intermediate chamber 36.

The first valve member part 24 includes the lower tubular stem 46, an enlarged part 96 extending upward from the stem 46, the spindle 42, and the lower sealing ring 28. The lower end of the spindle 42 is threadably engaged in the enlarged part 96 of the first valve member part 24, and the lower opening 102 of the central passageway 40 is connected to the inlet tube 38 extending through the stem 46. The central passageway 40 extends upward through the axis of the spindle 42 but is spaced from the upper end of the spindle at a point where it opens into the exit 44 through the sidewall 104.

An annular outward extension 106 of the spindle 42 is disposed just above the upper side of the enlarged part 96, and the lower sealing ring 28 is held in a peripheral groove 107 of the annular extension by an annular flange 108 extending upward from the enlarged part. Thus the lower sealing ring 28 forms a seal between the enlarged part 96 and the annular extension 106 preventing fluid flow therebetween into the interior passageway 20. Orifices 110 in the annular extension 106 of the spindle 42, located centrally of the lower sealing ring 28 and an annular area 100 of the enlarged part 96 around the spindle extend the intermediate chamber 36 downward to the annular passageway 48 of the stem 46.

In the closed position of the valve 10 where a frustoconical surface of the upper sealing ring 30 is pressed against and sealed with a matching frustoconical surface of the upper seat 34 and a frustoconical surface of the lower ring 28 is pressed against and sealed with a matching frustoconical surface of the lower seat 32, the intermediate chamber 36 defined by the spaced apart first and second valve member parts 24, 26 may be washed by cleaning fluid. The fluid is forced through the inlet tube 38, passes through the central passageway 40 of the spindle 42 and out the exit 44 thereof, into the annular area 78 defined between the inner part 72 and the spindle 42, through the passageways 92 in the inner part, into the intermediate chamber 36 and out through the exit passageways 110, 100, 48 of the annular spindle extension 106, the enlarged part 96 and the stem 46. The upper and lower sealing rings 28, 30 form a double barrier between the fluid in the upper and lower pipes 16, 18. Flowing cleaning solution cleans the interior surface 111 of the interior passageway 20 between the upper and lower seats 32, 34 without the cleaning solution contaminating either the liquid in the upper or lower pipe 16, 18. If either of the seals should fail, the liquid from either the upper or lower pipe 16, 18 would flow into the intermediate chamber 36 and out through the annular passageway 48 in the stem 46. Preferably, the cleaning solution and the water used thereafter to rinse the cleaning solution are passed through the intermediate chamber 36 at a lower pressure than the pressure of liquid passing through either the upper or lower pipes 16, 18 so that in the event of a seal failure, the leakage will be into rather than from the intermediate chamber.

At its upper end, the spindle 42 of the first valve member part 24 is connected to the coaxial rod 58 which is joined at its upper end to the pneumatic actuator 37 (FIG. 1) that reciprocates the rod and the connected first valve member part 24 upwardly and downwardly. The sleeve 60, telescoped around the rod 58, is connected to the upper end of the outer part 62 of the second valve member part 26 and has an interior diameter substantially equal to the exterior diameter of the rod to slide relative thereto. A plug 112 closes off the upper opening 56 in the upper pipe 18 and contains a bore 113 through which pass the telescoping rod 58 and sleeve 60. An O-ring 116 defines a seal between the bore 113 of the plug 112 and the reciprocating sleeve 60, and an O-ring 114 defines a seal between the spindle 42 and the bore 66 of the outer part 62 of the second valve member part 26.

Figure 2:
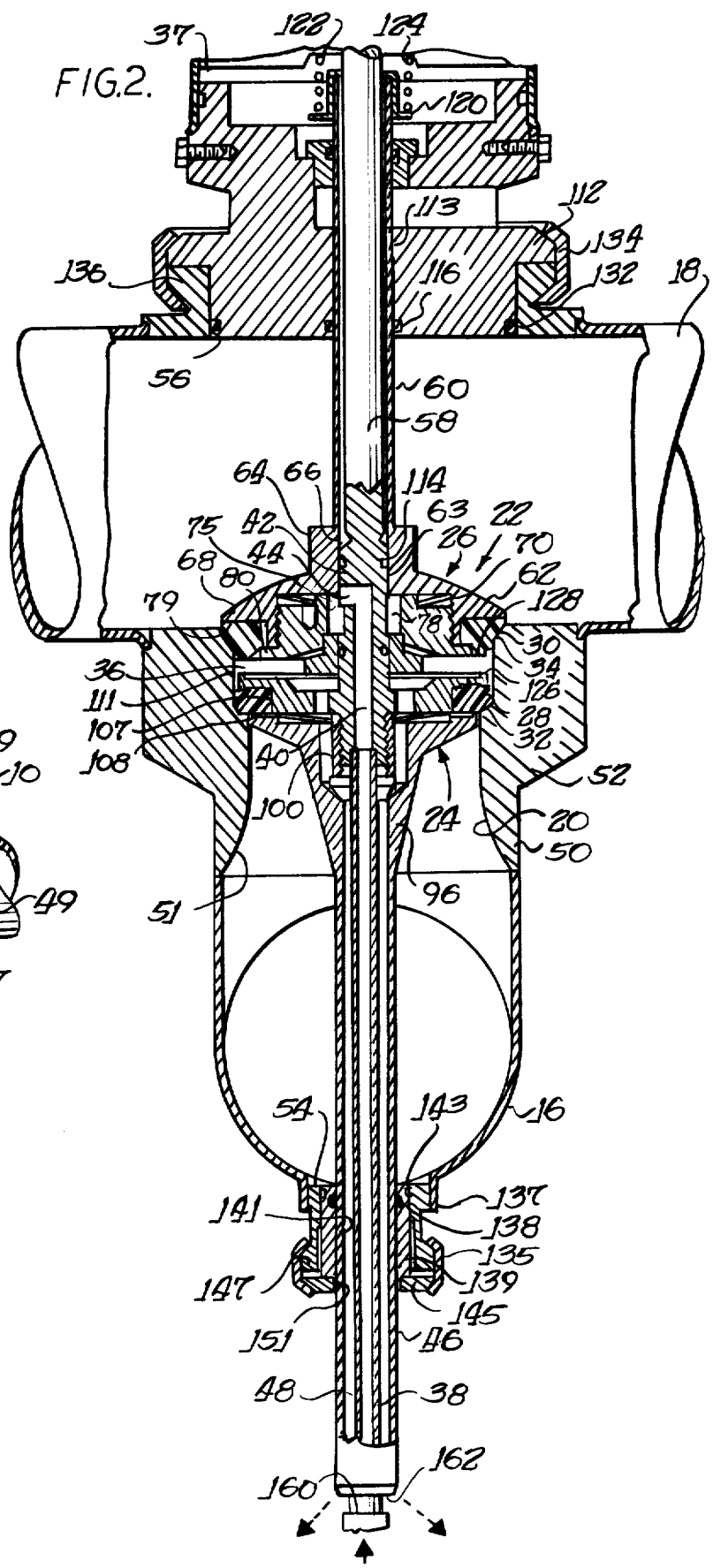
FIG. 2 is an enlarged cross-sectional view of the valve of FIG. 1 shown in the closed position.
Figure 4:
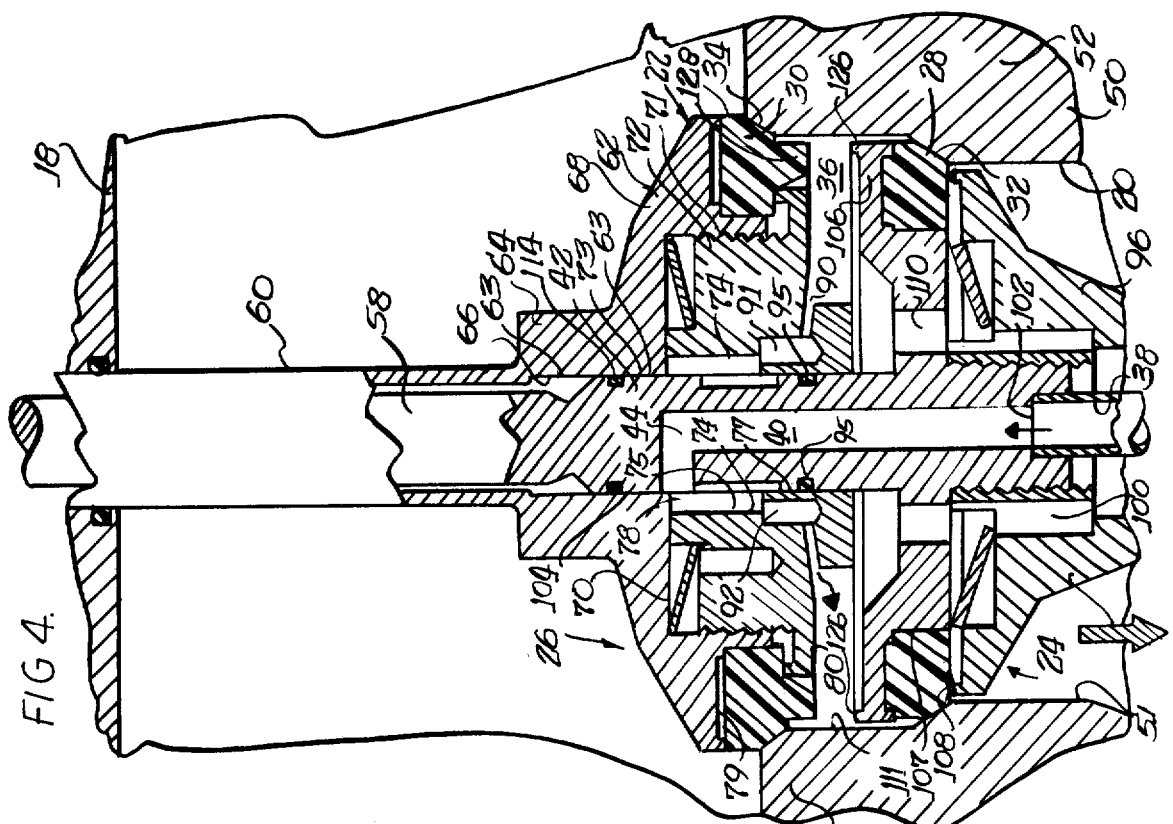
FIG. 4 is a cross-sectional view, similar to FIG. 3, showing the valve member in the closed position.

The upper end of the sleeve 60, slidably telescoped around the rod 58, is spaced from the connection of the rod to the actuator 37 and has an outwardly extending upper flange 120 (FIG. 2). A compression spring 124 is disposed around the rod 58 between the upper surface of the flange 120 and a lower surface 122 of the actuator 37 to bias the second valve member part 26 downward relative to the first valve member part 24. When the actuator 37 reciprocates the rod 58 upward, pulling the first valve member part 24 upward and breaking the seal between the lower ring 28 and the lower seat 32, the biasing force of the spring 124 holds the second valve member part 26 downward to maintain the upper seal until an upwardly extending annular seat 126 on the annular portion 106 of the spindle 42 contacts and seals with a downwardly depending flange 128 of the upper sealing ring 30 to block communication between the much reduced intermediate chamber 36 and the interior surface 111 of the intermediate passageway 20. As the first valve member part 24 continues upward, contact between the first and second valve member parts causes the second part 26 including the sleeve 60, to follow the first part upward breaking the seal between the upper ring 30 and the upper seat 34. When the rod 58 and sleeve 60 are fully reciprocated upward, the valve member 22 is generally centrally located in the upper pipe 18 and fluid may flow around the valve member 22 and through the interior passageway 20 between the upper pipe and lower pipe 16.

When it is necessary to cut off flow between the lower and upper pipes 16, 18, the process is reversed, and the actuator 37 drives the rod 58 downward. The biasing of the spring 124 holds the second valve member part 26 against the first valve member part 24 to maintain the seal between the depending flange 128 of the upper ring 30 and the annular seat 126 of the annular extension 106 of the spindle 42 until the upper ring 30 forms a seal with the upper seat 34 and prevents further downward movement of the second valve member part 26. The first valve member part 24 continues to be driven downward by the rod 58 until the lower ring 28 seals with the lower seat 32, and as it moves away from the second part 26 breaking the seal therebetween, it reforms the intermediate chamber 36 which is cleaned and rinsed prior to being opened once again.

The upper opening 56 of the valve 10 is sufficiently large that the valve member 22 may pass through. The plug 112, which closes off the upper opening 56 and through which the rod 58 and sleeve 66 extend, is sealed in the upper opening with an O-ring 132 and secured therein by a clamp 134 to an annular ferrule 136 welded to the upper pipe 18. The clamp 134 provides for positive alignment of the plug 112 which is connected at its upper end to the actuator assembly. By removing the clamp 134 which holds the upper plug 112 in the upper pipe opening 56 and a clamp 135 which holds a lower plug or bushing 139 in the lower pipe opening 54, the plugs and valve member 22 may be removed from the valve 10 for cleaning, inspection, or repair.

The tubular stem 46 extends through the opening 54 at the lower end of the lower pipe 16. A cylindrical ferrule or guide 137 (FIG. 2) is welded around the opening 54, and the bushing 139 fills the annular area between the stem 46 and the ferrule. The bushing 139 has a central bore 141 through which the stem 46 reciprocates and an O-ring 138 is disposed between the stem and the bushing to maintain a fluid seal around the reciprocating stem. An O-ring 143 between the bushing 139 and the guide 137 forms a fluid seal therebetween to maintain the fluid integrity of the lower pipe 16. The bushing 139 is maintained in the guide 137 by a washer 145 disposed below the bushing which is clamped to an annular flange 147 of the guide. The aperture 151 of the washer 145 has a diameter somewhat larger than the exterior diameter of the stem 46 whereby the stem reciprocates freely through the aperture even if the bushing bore 141 is slightly eccentric to the valve member axis to compensate for any misalignment resulting from welding the various members of the valve housing 14 together.

While the central passageway 38 through the valve stem 46 is connected to a source of cleaning solution by a connector 160 (FIG. 2), the stem will generally be open at its bottom end 162; and fluid flowing through the annular passageway 48 will typically be allowed to drain into a drainage trough in the floor, onto a curbed area of the floor or through an enclosed flexible drain. Any leakage of liquid onto the floor resulting from a failed valve member 22 will be readily apparent to workers in the plant who may take corrective action.

The valve member components are preferably made of stainless steel which will provide long life without rusting or reacting with the liquid flowing therethrough. The sealing rings are preferably formed of chemically inert Teflon, and the O-rings are preferably formed of a suitable elastomer.

A plurality of valve housings 14 may be welded together in a modular array. The certain alignment, provided by the unitary welded construction of the housings 14, is particularly important in such modular arrays where it is generally impossible to remove and replace a single valve housing. The valve members of such arrays may, of course, be repaired or replaced simply by removing the clamps 134, 135 and withdrawing the valve member 22 through the opening 56 in the upper pipe 18. An advantage of providing modular arrays rather than linking individual valves together is the compactness of the array which may be achieved. The feature of having a common lower inlet 38 and drain 48 at the lower end of the valve housings 14 is particularly advantageous in compact modular arrays.

While the invention has been described in terms of a certain preferred embodiment, modifications obvious to one with ordinary skill in the art may be made without departing from the scope of the present invention.

Various features of the invention are set forth in the following claims.

What is claimed is:

1. A valve for allowing the separate flow of liquids through two separate lines without intermixing when the valve is in the closed position and for permitting flow between the two lines when the valve is in the open position, which valve comprises housing means having an internal wall forming an interior passageway therewithin which interconnects a first region designed for connection to a first piping system and a second region designed for connection with a second piping system, a valve member disposed within said housing a generally cylindrical rod member extending from an exterior location into an upper end of said housing upon which said valve member is mounted for reciprocating movement, said rod member being adapted for attachment to actuator means disposed exterior of said housing for reciprocating said valve member, said valve member having a hollow extension stem portion coaxial with said rod member that extends exterior of said housing through the lower end thereof, said valve member including first and second relatively movable parts, the first part being affixed to said rod member and said second part including a sleeve portion which is disposed in surrounding coaxial relation to said rod member for sliding relative to said rod member and extends through said housing, compression spring means connected to said sleeve portion at a location exterior of said housing for biasing said second valve member part toward said first valve member part so that said parts move relatively toward each other when said rod member reciprocates to open the valve, said interior passageway wall being formed with first and second annular seats, the diameter of said first annular seat being less than the diameter of said second annular seat, said first valve member part carrying first ring means for sealing against said first annular seat, said second valve member part carrying second ring means for sealing against said second annular seat, tube means located within said hollow stem and extending from a location exterior of said housing to a central passageway within a generally cylindrical spindle portion of said first valve member part, said central passageway having a lower entrance end and upper exit through the sidewall of said spindle portion, said hollow stem and said tube means forming an annular passageway therebetween, said first and second valve parts being spaced apart from each other when said valve is in the closed position to create an intermediate chamber therebetween, said second valve member part having passageways communicating said upper exit with said intermediate chamber when said valve is in said closed position, said passageways including constricted nozzle portions, said intermediate chamber extending to said internal wall at a location between said first and said second seats and also extending downward to said annular passageway, whereby any liquid leaking past either of said ring means drains exterior of said housing through said annular passageway and whereby said intermediate chamber can be cleaned without disassembly by causing cleaning fluid to flow through said constricted nozzle passageway portions and into said intermediate chamber in forceful sprays against the surfaces of said internal wall and out of said housing through said annular passageway.

2. A valve in accordance with claim 1 wherein said second seal ring means includes a depending flange and wherein said first valve member part includes a third annular seat against which said flange abuts when the valve is in the open position.

3. A valve according to claim 1 in which opening means, in the lower end of said housing through which said stem extends, includes a guide depending from the lower end of said housing defining a cylindrical passageway thereinto, a bushing disposed in said guide having a bore through which said stem reciprocates, first resilient sealing means within said bushing bore to prevent liquid passage between said bushing bore and said reciprocating stem, second resilient sealing means between said guide and said bushing, and a washer secured to the outer end of said guide to retain said bushing in said guide, said washer having an aperture through which said stem reciprocates with an interior diameter greater than the exterior diameter of said stem, whereby said stem reciprocates through said aperture without binding even if the axis of said bushing bore is slightly eccentric of the reciprocal axis of said valve member.

* * * * *